Figure 1:
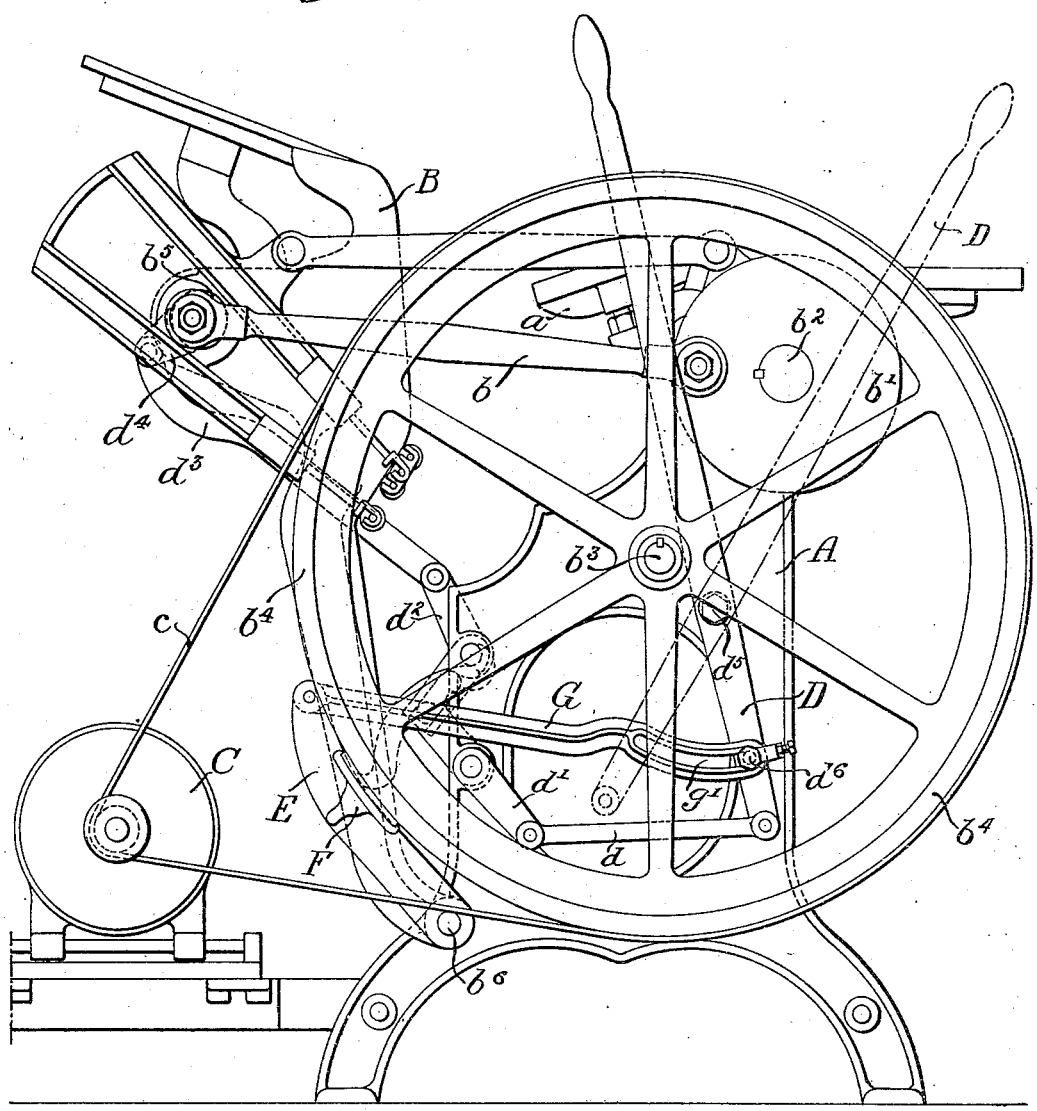

C. A. WRIGHT.
BRAKE FOR PRINTING PRESSES.
APPLICATION FILED SEPT. 8, 1909.

943,507.

Patented Dec. 14, 1909.
2 SHEETS—SHEET 1.

Witnesses:
Wills A. Burrowes
Walter Chinry

Inventor:
Charles A. Wright,
by his Attorneys
Howson & Howson

C. A. WRIGHT.
BRAKE FOR PRINTING PRESSES.
APPLICATION FILED SEPT. 8, 1909.
943,507.
Patented Dec. 14, 1909.
2 SHEETS—SHEET 2.
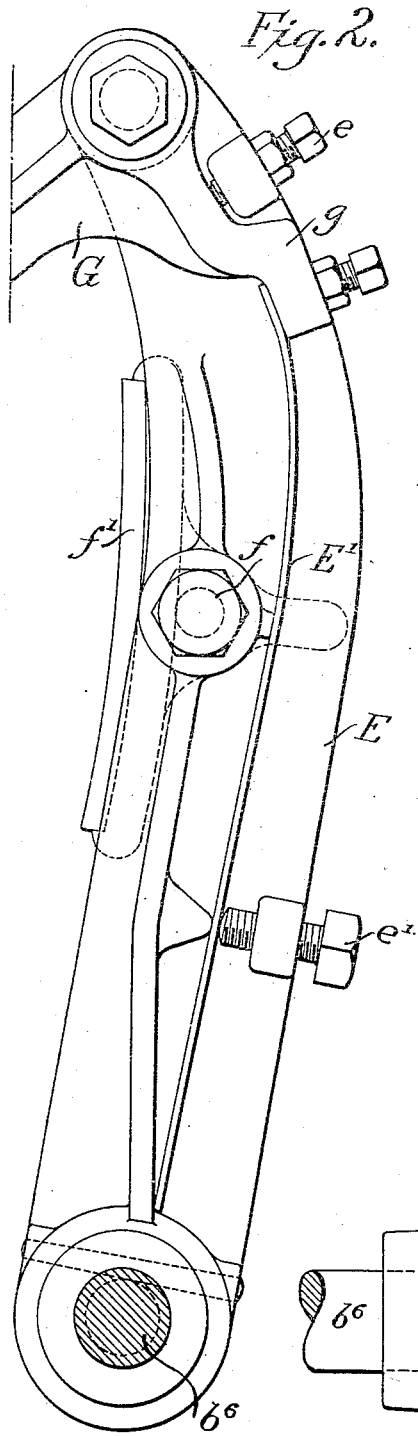
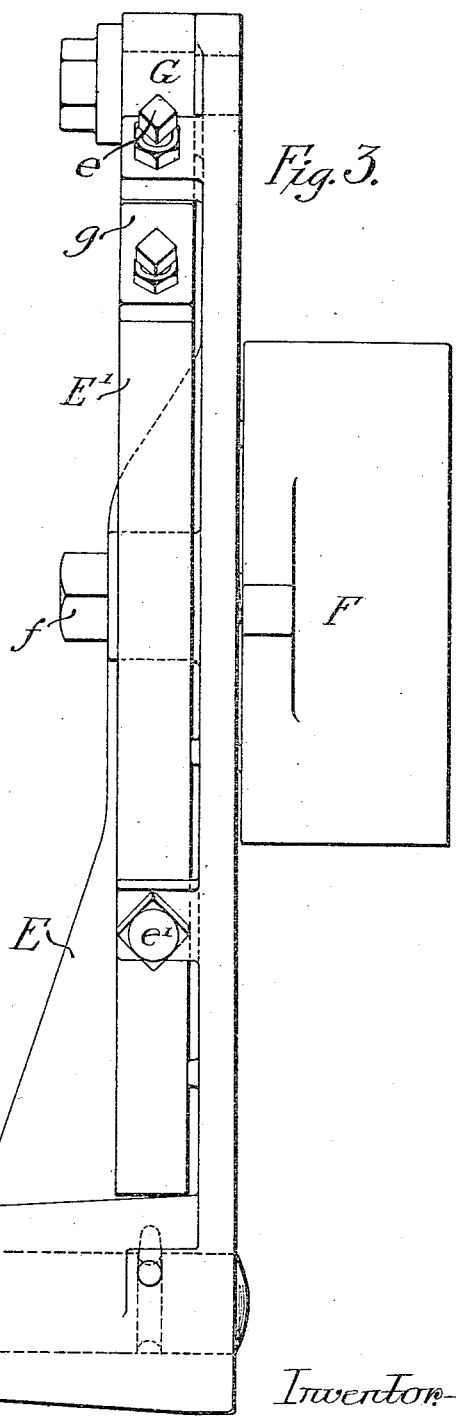
Witnesses.
Wills A. Burrowes
Walter Chism
Inventor.
Charles A. Wright.
by his Attorneys.
Howson & Howson

UNITED STATES PATENT OFFICE.

CHARLES A. WRIGHT, OF PHILADELPHIA, PENNSYLVANIA.

BRAKE FOR PRINTING-PRESSES.

943,507.  Specification of Letters Patent.  Patented Dec. 14, 1909.

Application filed September 8, 1909.  Serial No. 516,714.

*To all whom it may concern:*

Be it known that I, CHARLES A. WRIGHT, a citizen of the United States, residing in Philadelphia, Pennsylvania, have invented certain Improvements in Brakes for Printing-Presses, of which the following is a specification.

One object of my invention is to provide a brake for quickly stopping the operation of printing presses, especially of the Gordon type, which shall possess a minimum number of parts and be of such a construction as to be conveniently applicable to presses already installed, without requiring material changes to be made.

I further desire to provide a printing press brake so constructed and arranged as to be operable by the throwoff lever after this has been moved to the position to prevent further impressions being made by the type; it being further desired that the brake shall act upon that portion of the fly wheel of the press not engaged by the driving belt.

It is also desired that the brake shall be relatively simple, inexpensive and compact in construction and of such a nature as to require but little attention.

These objects and other advantageous ends I secure as hereinafter set forth, reference being had to the accompanying drawings, in which:—

Figure 1, is a side elevation of a press of the Gordon type, showing my invention applied thereto; and Figs. 2 and 3, are respectively a side and an end elevation of the brake shoe and its associated parts.

In the above drawings, A represents the fixed frame of a press on which is pivoted the customary oscillatory frame B carrying the type form and the inking mechanism. This latter frame is connected by a rod $b$ with a crank $b'$ fixed to a shaft $b^2$ driven through suitable gearing (not shown) from a main shaft $b^3$. This latter has fixed to it a fly wheel $b^4$ to which power from a motor C is applied through a belt $c$. Suitably mounted on the fixed frame A is an oscillatory platen $a$ of the customary construction, and the rod $b$ is connected to the oscillatory frame B through an eccentric $b^5$, which may be turned through a partial revolution by means of the throw-off lever D, connected to it through a link $d$, levers $d'$, $d^2$, a link $d^3$, and an arm $d^4$. All of the above described parts are well known to the art and in order to apply my invention to the machine, so that the flywheel and hence the machine as a whole may be quickly stopped after current has been cut off from the motor, I extend the pivot rod $b^6$ by which the oscillatory frame B is connected to the frame A, and on such extension loosely mount an arm E by means of a pin $b^7$ fitting into an annular groove in said rod. The free end of said arm has pivoted to it one end of a link G from which projects an arm $g$ whose movement in one direction is limited by a set screw $e$ mounted in a suitably placed lug on the arm E. A second set screw $e'$ on said arm serves to hold a spring E' so that one end thereof bears upon the arm $g$ tending to keep it in engagement with the set screw $e$ and also to return it to such engagement when it is moved therefrom. The opposite end of the link G is provided with a slot $g'$ curved concentrically with the pivot bolt $d^5$ of the throw-off lever and formed for the reception of a bolt $d^6$ whereby it is movably held to said lever. Such an arrangement of parts places the arm E and the link G in or adjacent to the plane of movement of the throw-off lever D and between the flywheel $b^4$ and the adjacent face of the main frame A.

A brake shoe holder F is mounted upon a bolt $f$ which loosely passes through the arm E and projects at one side thereof so as to bring said holder immediately adjacent to the periphery of the fly wheel $b^4$; there being a brake shoe $f'$ of leather or other suitable material mounted in the face of said holder F so as to be capable of engaging the face of the fly wheel.

Under operating conditions the lever G and hence the brake attached thereto, are unaffected by the turning of the lever D to throw the oscillatory bed into and out of operative position, owing to the fact that the bolt $d^6$ is freely movable in the slot $g'$, which is of course made of any length suitable to accommodate such movement. When, however, it is desired to quickly stop the operation of the press, said lever is first brought to its off position, if it is in its on position, and is thereafter pushed beyond such off position away from the operator. The bolt $d^6$ through the link G then pulls the free end of the arm E and hence the brake shoe, toward the fly wheel, bringing said shoe into engagement with the face of said lever and stopping its revolution. As soon as pressure on the lever is released, the spring E', which forms in effect a yielding connection between the arm E and the link G, assists in drawing the brake shoe away from the face of the fly wheel. It is to be noted that said brake shoe acts upon that part of the fly wheel face between the two runs of the belt $c$, thus in no way interfering with the required operation of the press nor projecting beyond the general line thereof.

In order to apply the apparatus, it is only necessary to replace the ordinary pivot spindle of the oscillatory frame B by means of one of slightly greater length, and to provide the bolt $d^a$ on the throw-off lever, which is thus given additional work without having its regular and primary functions affected.

I claim:—

1. The combination of a press of the bed and platen type, having a fly wheel, and mechanism including a throw off lever for moving the bed into and out of operative relation with the platen; with a brake operative on the fly wheel, and including a lever the line of whose fulcrum is coincident with the line of the pivot between the bed and platen; and means for connecting said brake lever with the throw off lever; the same being arranged to cause application of the brake after the bed has been thrown out of operative relation with the platen.

2. The combination of a printing press having a fly wheel and a throw-off lever, an arm pivoted to the frame of the press, a shoe carried by said arm and placed to be operative on the fly wheel, a slotted link connecting said arm with the throw-off lever, with means for yieldingly connecting the arm and the link.

3. The combination of a printing press having a frame, a fly wheel, a throw-off lever mounted between said frame and said wheel, a link connected to the throw-off lever, an arm pivoted to the frame and connected to the link so as to lie adjacent to the plane of the lever and link, and a brake shoe carried by the arm so as to be brought into engagement with the face of the fly wheel when the lever is moved to one extremity of its throw.

4. The combination of a printing press having a frame, and an oscillatory portion, a pivot pin connecting said portion to said frame, an arm mounted on said pivot pin, a brake shoe carried by said arm, a throw-off lever for the press, and means for connecting said arm and said throw off lever.

5. The combination of a printing press having a fly wheel, a throw off lever, a pivot bolt connecting said lever with the frame of the press, a link having a slot formed concentrically with said pivot, a bolt passing through the slot and normally connecting the link to the lever, an arm pivoted to the frame of the press, and connected to one end of said link, with a brake shoe carried by said arm and placed to be operative on the face of the fly wheel.

6. The combination of a printing press having a fly wheel and a throw-off lever, an arm pivoted to the frame of the press, a brake shoe carried thereby and capable of engaging the face of the fly wheel, a link connecting the arm and the throw-off lever, an arm for said link, and a spring between said latter arm and the brake-shoe-carrying arm.

In testimony whereof, I have signed my name to this specification, in the presence of two subscribing witnesses.

CHARLES A. WRIGHT.

Witnesses:
WILLIAM E. BRADLEY,
WM. A. BARR.